(12) United States Patent
Talarico (10) Patent No.: US 9,533,783 B2
(45) Date of Patent: Jan. 3, 2017

(54) CUSTOM-CONTENT BEVERAGE CARTRIDGE MANUFACTURING AND VENDING MACHINE

(71) Applicant: David Joseph Talarico, Holmdel, NJ (US)

(72) Inventor: David Joseph Talarico, Holmdel, NJ (US)

(73) Assignee: David J. Talarico, Holmdel, NJ (US)

( * ) Notice: Subject to any disclaimer, the term of this patent is extended or adjusted under 35 U.S.C. 154(b) by 0 days.

(21) Appl. No.: 14/561,887

(22) Filed: Dec. 5, 2014

(65) Prior Publication Data

US 2015/0158608 A1 Jun. 11, 2015

Related U.S. Application Data

(60) Provisional application No. 61/913,236, filed on Dec. 6, 2013.

(51) Int. Cl.

| | |
|---|---|
| G06F 17/00 | (2006.01) |
| B65B 29/02 | (2006.01) |
| A47J 42/52 | (2006.01) |
| G07F 11/70 | (2006.01) |
| G07F 13/10 | (2006.01) |
| G07F 13/02 | (2006.01) |
| G07F 13/00 | (2006.01) |
| G07F 13/04 | (2006.01) |
| G07F 13/06 | (2006.01) |

(52) U.S. Cl.
CPC .............. *B65B 29/02* (2013.01); *A47J 42/52* (2013.01); *G07F 11/70* (2013.01); *G07F 13/00* (2013.01); *G07F 13/02* (2013.01); *G07F 13/025* (2013.01); *G07F 13/04* (2013.01); *G07F 13/065* (2013.01); *G07F 13/10* (2013.01)

(58) Field of Classification Search
None
See application file for complete search history.

(56) References Cited

U.S. PATENT DOCUMENTS

| | | | |
|---|---|---|---|
| 4,930,985 A | | 6/1990 | Klute |
| 5,325,765 A | | 7/1994 | Sylvan et al. |
| 5,840,189 A | | 11/1998 | Sylvan et al. |
| 6,726,947 B1 | | 4/2004 | Gutwein et al. |
| 7,234,609 B2 | | 6/2007 | DeLazzer et al. |
| 7,964,230 B2 | | 6/2011 | Kirschner et al. |
| 8,025,180 B2 | * | 9/2011 | Magno ............... A47J 31/3642 221/108 |
| 8,336,186 B2 | | 12/2012 | Bloome et al. |
| 8,517,213 B2 | | 8/2013 | Lazalier et al. |
| 8,800,810 B2 | * | 8/2014 | Magno ............... A47J 31/3642 221/123 |
| 2003/0057234 A1 | * | 3/2003 | Perez Vales ............ A47F 1/035 222/144.5 |
| 2004/0188517 A1 | * | 9/2004 | Choi ....................... G07F 13/10 235/381 |

(Continued)

*Primary Examiner* — Prasad Gokhale (57) ABSTRACT

A custom-content beverage cartridge manufacturing and vending machine has a cabinet housing, a user interface area, and a dispensing area that allows an untrained user to obtain beverage cartridges by entering instructions using aspects of the user interface area. The machine allows the user to quickly and easily produce factory quality beverage cartridges according to the user's particular tastes and preferences.

1 Claim, 5 Drawing Sheets

(56) References Cited

U.S. PATENT DOCUMENTS

| | | | |
|---|---|---|---|
| 2005/0038559 A1* | 2/2005 | Ghidotti | B67D 1/0014 |
| | | | 700/239 |
| 2005/0139084 A1* | 6/2005 | Caswell | A47J 31/42 |
| | | | 99/286 |
| 2007/0062375 A1 | 3/2007 | Liverani et al. | |
| 2009/0101233 A1* | 4/2009 | Owens | B67D 1/0041 |
| | | | 141/369 |
| 2009/0211713 A1 | 8/2009 | Binacchi | |
| 2010/0239717 A1 | 9/2010 | Yoakim et al. | |
| 2010/0313766 A1 | 12/2010 | Suggi Liverani et al. | |
| 2011/0076361 A1 | 3/2011 | Peterson et al. | |
| 2011/0120316 A1* | 5/2011 | Castellani | A47J 31/52 |
| | | | 99/280 |
| 2011/0305801 A1 | 12/2011 | Beer | |
| 2012/0052163 A1 | 3/2012 | Doleac et al. | |
| 2012/0058226 A1 | 3/2012 | Winkler et al. | |
| 2012/0070542 A1 | 3/2012 | Camera et al. | |
| 2012/0251671 A1 | 10/2012 | Kamerbeek et al. | |
| 2013/0055903 A1 | 3/2013 | Deuber | |
| 2013/0087050 A1* | 4/2013 | Studor | A47J 31/52 |
| | | | 99/285 |
| 2013/0091802 A1* | 4/2013 | Bentley | A47J 42/50 |
| | | | 53/111 R |
| 2013/0108752 A1 | 5/2013 | Kollep et al. | |
| 2013/0180408 A1 | 7/2013 | Eichler et al. | |
| 2013/0199379 A1 | 8/2013 | Arnett | |
| 2013/0270176 A1 | 10/2013 | Schreiber | |
| 2014/0290493 A1* | 10/2014 | Rivera | A47J 31/407 |
| | | | 99/285 |

\* cited by examiner

CUSTOM-CONTENT BEVERAGE CARTRIDGE MANUFACTURING AND VENDING MACHINE

CROSS-REFERENCE TO RELATED APPLICATIONS

This application claims the benefit of provisional patent application Ser. No. 61/913,236, filed 2013 Dec. 6 by the present inventor.

BACKGROUND

Prior Art

The following is a tabulation of some prior art that presently appears relevant:

U.S. PATENTS

| Pat. No. | Kind Code | Issue Date | Patentee |
|---|---|---|---|
| 8,336,186 | B1 | Dec. 25, 2012 | Bloome et al. |
| 5,840,189 | B1 | Nov. 24, 1998 | Sylvan et al. |
| 5,325,765 | B1 | Jul. 5, 1994 | Sylvan et al. |
| 7,234,609 | B2 | Jun. 26, 2007 | DeLazzer et al. |
| 6,726,947 | B1 | Apr. 27, 2004 | Gutwein et al. |
| 7,964,230 | B2 | Jun. 21, 2011 | Kirschner et al. |
| 8,517,213 | B2 | Aug. 27, 2013 | Lazalier et al. |

U.S. PATENT APPLICATION PUBLICATIONS

| Publication Nr. | Kind Code | Publ. Date | Applicant |
|---|---|---|---|
| 0239717 | A1 | Sep. 23, 2010 | Yoakim et al. |
| 0270176 | A1 | Oct. 17, 2013 | Schreiber |
| 0180408 | A1 | Jul. 18, 2013 | Eichler et al. |
| 0076361 | A1 | Mar. 31, 2011 | Peterson et al. |
| 0070542 | A1 | Mar. 22, 2012 | Camera et al. |
| 0305801 | A1 | Dec. 15, 2011 | Beer |
| 0251671 | A1 | Oct. 4, 2012 | Kamerbeek et al. |
| 0199379 | A1 | Aug. 8, 2013 | Arnett |
| 0211713 | A1 | Aug. 27, 2009 | Binacchi |
| 0108752 | A1 | May 2, 2013 | Kollep et al. |
| 0052163 | A1 | Mar. 1, 2012 | Doleac et al. |
| 0055903 | A1 | Mar. 7, 2013 | Deuber |
| 0062375 | A1 | Mar. 22, 2007 | Liverani et al. |
| 0058226 | A1 | Mar. 8, 2012 | Winkler et al. |
| 0313766 | A1 | Dec. 16, 2010 | Suggi Liverani et al. |

To brew a decent cup of coffee or espresso using traditional methods not only requires a certain degree of skill, it is also often a lengthy and messy process. Conversely, recent advancements in cartridge-based single-serve coffee and espresso machine technology have made brewing these beverages quick, easy, and virtually mess-free. Because of this, approximately 20% of US households currently have a cartridge-based brewing system, and that figure has been growing annually.

However, the exceptional convenience of these systems comes at a cost. First and foremost, a beverage brewed in a cartridge-based system costs 10-20 times more than the same beverage brewed using traditional methods. Secondly, there is a limited selection of coffee varieties available in cartridge form. Moreover, the amount of coffee in the cartridge is predetermined, so it always produces an average strength cup of average volume.

Some brewing-machine models have attempted to fix this problem by allowing the user to select the volume, but even then you have no control over strength. In my experience, setting the volume to the highest setting over-extracts the grounds producing a watered-down bitter concoction, which forces me set the volume to the average setting and to use a second expensive cartridge for a larger beverage.

There have been many attempts to resolve this shortcoming of cartridge-based brewing systems. One attempt is to create a re-useable cartridge that can be filled by the user with their selected beverage medium. An example of this type of device is described in US20020148358A1. In my experience, these re-useable cartridges are difficult to fill without spilling some of the beverage medium. Furthermore, they must be cleaned after each use, thereby undermining the convenience associated with the cartridge-based brewing system.

Another attempt to resolve these issues is to create a partially or fully disposable cartridges that the consumer must fill and seal at home. Some examples include the Simple Cups™ and Fill 'n Brew™ systems. In my experience, using systems can be very time consuming and messy, again undermining the convenience associated with the cartridge-based brewing system. Furthermore, I have noticed that systems like these with disposable lids often leak out of the top, causing beverage medium (in my case coffee grounds) to end up in my beverage, which is quite unpleasant. This leak also seems to cause a lack of pressure inside the cartridge, as the beverage produced is very weak.

The disclosed invention would allow for a consumer to have fully customizable coffee experience, all with the convenience of a cartridge-based brewing system. For example, in one embodiment, a consumer would simply approach a conveniently located (e.g. in a supermarket, mall, etc.) manufacturing and vending machine, enter their preferences into the user interface, insert their beverage medium (e.g. coffee grounds), and the machine would fill, seal, and dispense the cartridges automatically. One embodiment contains a beverage medium, allowing the consumer to purchase a beverage medium, fill, seal and receive customized cartridges all in one transaction.

The disclosed invention thusly allows consumers full control over the type and amount of beverage medium in each cartridge. One embodiment even includes a grinder, to allow for an even fresher tasting beverage to be produced from the dispensed cartridges. Another embodiment includes a roaster and a grinder, to allow for even more control (e.g. coffee roast type) over the contents of their cartridge.

SUMMARY

In accordance with one embodiment a custom-content beverage manufacturing and vending machine can manufacture beverage cartridges for use in (a) cartridge-based brewing system(s).

ADVANTAGES

Accordingly, advantages of one or more aspects are as follows: to provide less expensive beverage cartridges, to provide custom-content beverage cartridges, and to provide a convenient way to obtain custom-content beverage cartridges. Other advantages of one or more aspects will be apparent from a consideration of the drawings and ensuing description.

DETAILED DESCRIPTION

Figure 1:
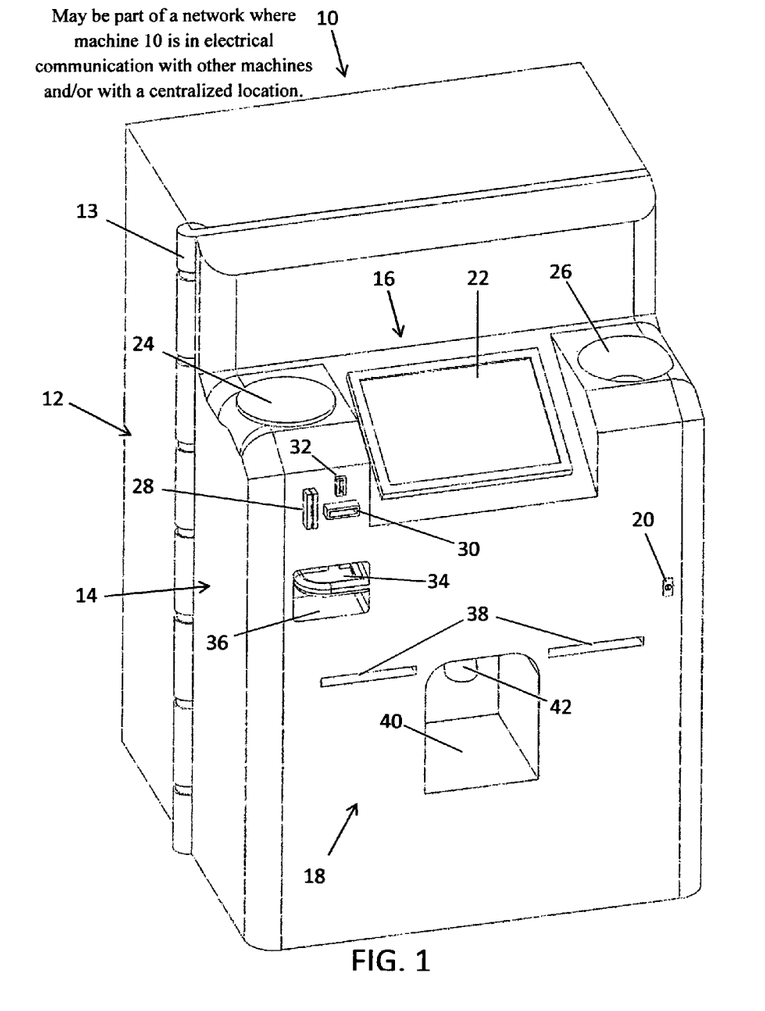
FIG. 1 is a perspective view of a beverage cartridge manufacturing and vending machine in its closed configuration.
Figure 2:
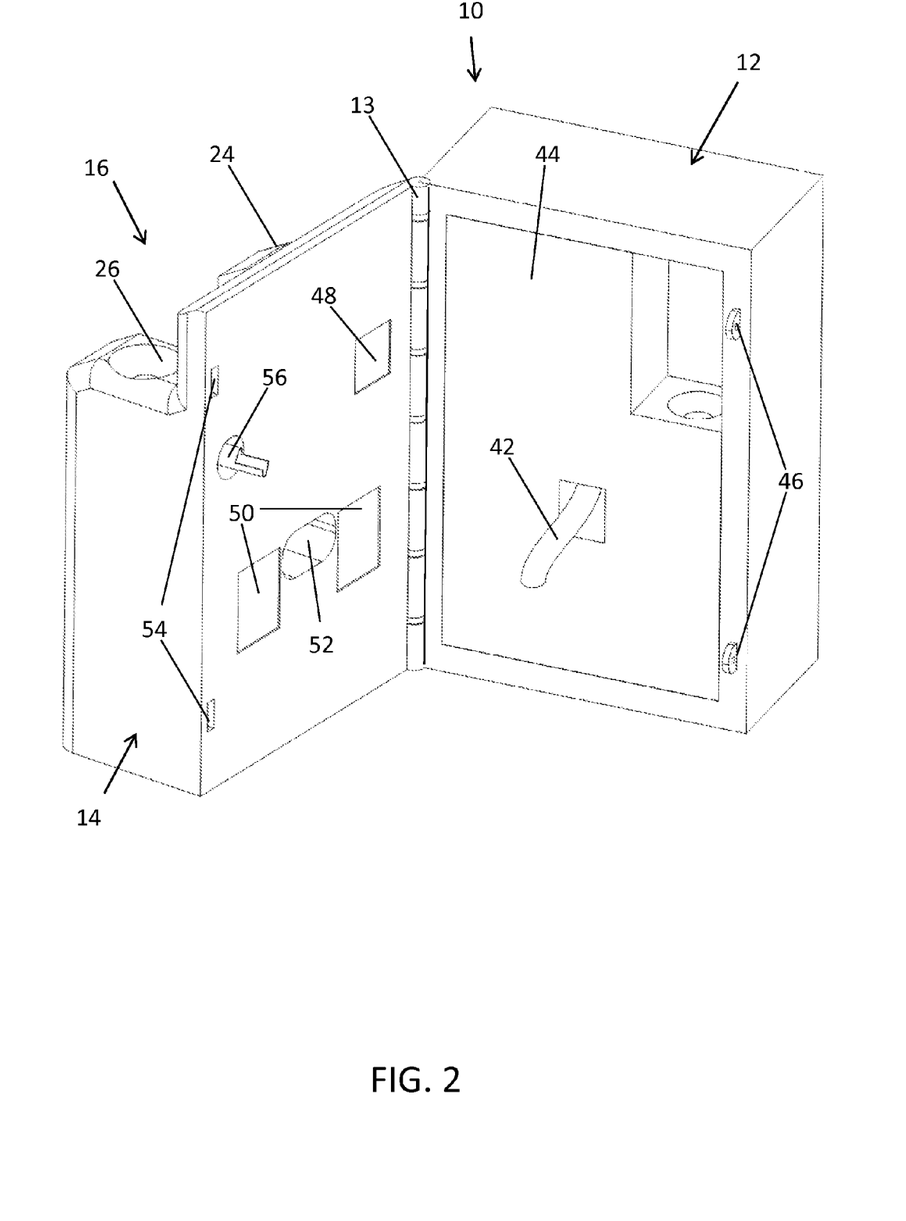
FIG. 2 is a perspective view of a beverage cartridge manufacturing and vending machine in its open configuration.

FIG. 1 and FIG. 2—First Embodiment

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

One embodiment of a beverage cartridge manufacturing and vending machine, generally designated 10, is illustrated in FIG. 1 and FIG. 2. In one embodiment, vending machine 10 is one of a plurality of cartridge manufacturing and vending machines included within a custom-content beverage cartridge manufacturing and vending system having a plurality of such machines situated at a plurality of hosting locations. The cartridge manufacturing and vending machines of a particular cartridge manufacturing and vending system preferably form a network. As such, those machines are preferably in electrical communication with each other and with a central office from which inventory decisions can be made.

In one embodiment, beverage cartridge manufacturing and vending machine 10 is a stand-alone unit, which is not in electrical connection with other units or to a central office.

A beverage cartridge (not shown) manufactured by vending machine 10 is for use with a known cartridge-based brewing system technology to form any suitable beverage such as tea, coffee, other infusion-type beverages, beverages formed from a liquid or powdered concentrate, etc. The cartridge may contain a suitable beverage medium (not shown), e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutraceuticals, etc.), and/or other beverage-making material (such as powdered milk or other creamers, sweeteners, thickeners, flavorings, and so on). It may also contain a pierceable impermeable cup-shaped shell and/or a filter element/wall and/or a delivery wall and/or a pierceable lid.

Examples of such cartridges described in U.S. Ser. No. 00/532,5765A, U.S. Ser. No. 00/584,0189A, US20120058226A1, U.S. Pat. No. 6,607,762 B2, US 20050051478 A1, U.S. Pat. No. 6,645,537 B2, US 20100303964 A1, U.S. Pat. No. 6,589,577 B2, US 20130101716 A1, US 20130122167 A1, U.S. Pat. No. 8,361,527 B2, US 20120070542 A1, U.S. Pat. No. 6,740,345 B2, US 20060280841 A1, US 2013/0180408 A1, US 2013/0108752 A1, US20120070542A1, US 2012/0251671 A1, US 2013/0055903 A1, US 2007/0062375 A1, U.S. Pat. Nos. 7,836,819, 8,464,630, 8,464,631, 8,464,632, US20070186784, US20100043644, US20100043645, US20100043646, U.S. Pat. Nos. 8,161,868 B2, 7,703,381 B2, 7,815,953 B2, 7,681,492 B2, US 20120006205 A1, U.S. Pat. No. 7,543,527 B2, EP 1555218 A1, EP 1555218 B1, EP 1595817 B1, US 20120118166 A1, EP 2179943 A1, US 20120031280 A1, EP 1364605 A1, WO 2013124234 A1, EP 2628694 A1, EP 1792849 A1, WO 2008125256 A1, WO 2010085824 A1, EP 2537777 A1, U.S. Pat. No. 7,490,542 B2, CN 102101560 B, US 20110283891 A1, WO 2012122329 A1, EP 2243405 A1, WO 2010046923 A1, U.S. Pat. No. 3,589,272 A, US 20040112223 A1, US20100239717A1, U.S. Pat. No. 8,257,766, EP 2230195 A1, US 20040115310 A1, WO 2013053655 A1, EP 0615921 A1, EP 1555218 A1, EP 2287090 B1, EP 1364605 A1, U.S. Pat. No. 6,849,285 B2, EP 1595817 A1, U.S. Pat. No. 6,698,333 B2, US 20130071522 A1, US 20110232500 A1, and EP 2530030 A1 are hereby incorporated by reference into this application. These cartridges are exemplary, and it will be appreciated that any cartridge containing a beverage medium used to form a beverage may be manufactured by vending machine 10, without departing from the true spirit and scope of the invention.

FIG. 1—External Components

Vending machine 10 includes a cabinet housing 12 with hinged front panel 14 and fixed top, bottom, rear, and side panels. As shown in FIG. 1, vending machine 10 further includes a user interface area 16 and a dispensing area 18. Depiction of user interface area 16 being integrated into front panel 14 is exemplary only and should not be construed as limited to this configuration. Additionally or alternatively, user interface area 16 and/or dispensing area 18 may be located in any other user-accessible portion of the vending machine 10. While shown adjacent to each other, in other embodiments, subsections comprising user interface area 16 and/or subsections comprising dispensing area 18 may be located in different portions of vending machine 10.

In one embodiment, machine housing 12 is a cabinet made from a combination of molded fiberglass and sheet metal. However, those skilled in the art will appreciate that the housing can be constructed from a variety of other suitable materials and with a variety of other suitable manufacturing techniques. In another embodiment, some or all of machine housing 12 is transparent, to allow consumers to view the inner workings of vending machine 10, thereby enhancing their experience and/or allowing the consumer to visually verify the cleanliness of the inside of vending machine 10. In still another embodiment, some or all of machine housing 12 may be used as advertising space, which may be leased out to third parties or the owner of the hosting location, or to promote special deals, instructions for the use of vending machine 10, or to advertise a general help hotline for further assistance with the use of vending machine 10.

FIG. 1—Front Panel

In one embodiment, the front panel 14 is rotatably mounted to housing 12 via hinge 13 such that an authorized serviceman may gain access to the inner components of vending machine 10 by first unlocking front panel 14 via a security measure 20. In other embodiments, the authorized serviceman may gain access to the inside of vending machine 10 by unlocking the front, side, top and/or rear panels, one or more of which may be rotatably and/or slidably mounted in a suitable manner. Additionally, one or more inner components may slide or roll out of housing 12 manually or by any suitable manual or electro-mechanical means to allow the serviceman to gain access to them. In any case, a variety of security measures can prevent access to the machine by anyone other than the authorized serviceman. In the embodiment depicted in FIG. 1, security measure 20 is a simple pin-and-tumbler, but this may be replaced by or used as a backup to one or more suitable security measures, such as a passcode-protected area of user interface 16, a separate keypad, infrared or radio frequency transmitters, etc.

FIG. 1—User Interface Area

In one embodiment, shown in FIG. 1, user interface area 16 of housing 12 comprises a keypad and/or touch screen 22, scale 24, beverage medium receptacle 26, a card validator 28, a bill validator 30, and a coin insert 32. Although these three monetary inputs are shown, it should be understood that any suitable manner and method of payment may be incorporated, and that other embodiments may contain less than three monetary inputs. In the case where keypad and/or touchscreen 22 is only a keypad, a display monitor (not shown) that incorporates known flat-panel display technology in an easily viewable location will be included in user interface area 16.

Optional touchscreen (or optional display monitor) provides for a user interface presenting visual display of pertinent information during the servicing, manufacturing, and vending processes of the machine 10.

In one embodiment, keypad and/or touchscreen 22 permits consumers and/or authorized servicemen to communicate with the vending machine 10 and/or central office linked in electrical communication with the dispensing machine. Keypad and/or touch screen 22 also permits consumers and/or servicemen to enter appropriate commands directed to carrying out specific machine tasks. It will be appreciated that the optional touch screen includes a monitor made with known technologies making it capable of being utilized as a user interface for entry of commands designed to carry out machine tasks.

Additionally, known audio technology could be incorporated with vending machine 10. In one embodiment, known audio technology is incorporated within vending machine 10 to broadcast focused audio directed to relatively small locations in front of the machine and/or in other designated locations at a hosting site.

Furthermore, it will be appreciated that additional user interface areas having additional or even identical user interface components could be incorporated within vending machine 10. For example, these components could be incorporated on other panels of the housing 12 of machine 10 so that the machine can be used simultaneously by multiple consumers, translating into more efficient manufacturing and vending in high traffic areas.

In one embodiment, scale 24 is a digital scale of suitable capacity and precision that weighs the consumer's previously acquired beverage medium prior to manufacturing and vending cartridges. The weight information obtained by scale 24, along with input(s) from the consumer, allows software incorporated into vending machine 10 to determine pertinent details of the prospective transaction, such as the price and quantity of cartridges to be manufactured and vended. In the embodiment shown in FIG. 1, scale 24 is a flat scale, but it will be appreciated that scale 24 may be any type of digital scale, such as a hanging digital scale, as long as the weight of the consumer's beverage medium can be determined to within a suitable accuracy.

In one embodiment, shown in FIG. 1, beverage medium receptacle 26 has a funnel-shaped opening that allows the consumer to provide an externally obtained beverage medium for the manufacture of the cartridge. Additionally or alternatively, one or more varieties of beverage media may be stored inside vending machine 10 and available for purchase through keypad and/or touchscreen 22 so that the consumer would not have to acquire a beverage medium from external sources.

In one embodiment, beverage medium receptacle 26 is a tray that is permitted to slide horizontally out of housing 12. In another embodiment, beverage medium receptacle 26 is a vertical rectangular panel, rotatably mounted at its bottom edge and weighted so that it is closed in its natural position, much like the door on an outdoor US post office collection box. In still other embodiments, beverage medium receptacle 26 may consist of a suction nozzle which sucks up the beverage medium from the consumer's container.

In one embodiment, beverage medium receptacle 26 employs an antimicrobial and/or low friction coating, such as PTFE, copper, and/or copper alloy, to inhibit biological growth and/or to prevent cross-contamination of beverage media.

In some embodiments, beverage medium receptacle 26 is covered by a small door (not shown). In some embodiments, this small door may be locked until a purchased has been made, so as to thwart attempts at vandalism. In some embodiments, beverage medium receptacle 26 is a funnel-shaped opening and the small door covers the wider portion of the funnel-shape. In some embodiments, beverage medium receptacle 26 is a funnel-shaped opening and the small door covers the narrower portion of the funnel-shape.

Card validator 28 is preferably designed in known fashion to read magnetically encoded membership and/or credit and/or debit cards for authorizing the performance of certain functions of vending machine 10. Card validator 28 is shown in in the embodiment depicted in FIG. 1 as an insertion-type validator. In other embodiments, card validator 28 may be a touch-type validator that requires only a touch of the card. In still other embodiments, the card validator 28 may be a contactless validator capable of reading the card without any contact (e.g., optically or by radio frequency). In some embodiments, the card validator 28 may be capable of reading types of monetary cards other than debit and credit cards.

FIG. 1—Dispensing Area

In one embodiment, shown in FIG. 1, dispensing area 18 of housing 12 comprises coin return tray 34, bill return tray 36, one or more bag dispenser(s) 38, cartridge dispensing platform 40, and cartridge dispenser 42. Coin return tray 34 allows for coins to be returned to a customer who has overpaid. Coins may be dispensed into coin return tray 34 using any suitable known coin processing technology, including those that would incorporate coin insert 32 (e.g. coin recyclers). Bill return tray 36 allows for bills to be returned to a customer who has overpaid. Bills may be dispensed using any suitable known bill processing technology, including those that would incorporate bill validator 30 (e.g. bill recyclers). In other embodiments, card validator 28 is the only monetary input available; therefore, these embodiments would not require bill validator 30, coin insert 32, coin return tray 34, or bill return tray 36. In other embodiments, no monetary inputs are available and instead, after the user instructs the machine to manufacture beverage cartridges, a receipt (not shown) is printed using known technology (not shown) and later presented to a cashier at the hosting location.

In one embodiment, bag dispenser(s) 38 provide disposable bags (not shown) to consumers for the collection of their purchased cartridges for free or for a small fee. The disposable bags may be made of any suitable material, such as brown paper, white paper, wax-coated paper, any suitable plastics, etc. Additionally or alternatively, one or more bag dispenser(s) 38 may provide reusable bags for free or for a small fee. Reusable bags may be dispensed by any suitable electromechanical means upon payment authorization. If the consumer does not have a bag of their own, they may elect to obtain one or more from bag dispenser(s) 38. If the bag is free-standing (e.g. rigid enough to stay open and erect under its own weight), the consumer may then place the bag onto dispensing platform 40 under cartridge dispenser 42. If the bag is not free-standing, small clips (not shown) on front panel 14 may hold the bag open in place under cartridge dispenser 42 while cartridges are being dispensed. In other embodiments, bag dispenser(s) are incorporated into an automated dispensing system (not shown), where bags are automatically dispensed and opened in position to collect cartridges from cartridge dispenser 42 by any suitable electro-mechanical means. Cartridge dispenser 42 uses any suitable means to dispense cartridges, such as a simple chute and/or one or more conveyors and/or suction and/or pneumatics and/or one or more drive wheel(s). In one embodiment, dispensing platform 40 contains a grate (not shown) which lies over a bin (not shown) to catch any spilled beverage medium.

In one embodiment, vending machine 10 employs a series of light emitters (not shown), each illuminating or blinking at different times to guide the user through the transaction process. The light emitters may consist of one or more of the following: LED's, incandescent bulbs, neon bulbs, fluorescent bulbs, halogen bulbs, OLED's, etc. The light emitters may have covers which may diffuse the light and/or filter the light coming from the light emitters to make them more visually appealing.

FIG. 2—Internal Components

FIG. 2 illustrates one embodiment of vending machine 10 with hinged front panel 14 in the open position. As shown in FIG. 2, vending machine 10 further includes cartridge manufacturing equipment 44, locking post(s) 46, a cash lockbox 48, bag refilling compartment(s) 50, a cartridge dispenser opening 52, locking slot(s) 54, and beverage medium chute 56.

In one embodiment, cartridge manufacturing equipment 44 uses suitable automated manufacturing methods to take a beverage medium in bulk from beverage medium chute 56, fill and seal plurality of cartridges according to consumer's specifications, and dispense the cartridges using cartridge dispenser 42 in a sufficiently short amount of time. Thus, cartridges are delivered to consumers from equipment 44 through cartridge dispenser opening 52 via cartridge dispenser 42. In one embodiment, cartridge dispenser 42 also allows vending machine 10 to dispense or return beverage medium to the consumer.

In one embodiment, equipment 44 is capable of manufacturing one type of cartridge for use in a particular type of brewing system. In other embodiments, equipment 44 is capable of manufacturing more than one type of cartridge, each for use in its respective type of brewing system.

In one embodiment, equipment 44 is capable of producing cartridges with a set amount of beverage medium per cartridge. In another embodiment, equipment 44 is capable of producing cartridges with a varying amount of beverage medium per cartridge, with only one fixed amount of beverage medium per cartridge per transaction. In another embodiment, equipment 44 is capable of producing cartridges with a varying amount of beverage medium per cartridge, with a varying amount of beverage medium per cartridge in the same transaction.

In one embodiment, equipment 44 uses all of the beverage medium supplied by the consumer. In another embodiment, equipment 44 requires the amount of beverage medium supplied to it to fall within a certain range. If the amount of beverage medium supplied does not fall within that range, some or all of the supplied beverage medium may be automatically returned to the consumer. In still another embodiment, the consumer may elect to use only some or all of the beverage medium they supplied. In some embodiments, the consumer may designate portions of the beverage medium to be put into more than one type of cartridge, for use in each type of cartridge's respective type of brewing system.

In another embodiment, cartridge manufacturing equipment 44 includes a grinder (not shown) that grinds the beverage medium to the appropriate fineness for the brewing system in which the cartridges will be used, before filling and sealing the cartridges. The grinder may be a burr, blade, or roller type grinder. In still another embodiment, cartridge manufacturing equipment 44 includes a roaster (not shown), which uses known technology to roast the beverage medium before grinding, then filling and sealing cartridges. In some embodiments, cartridge manufacturing equipment 44 uses manufacturing processes such as those described in U.S. Pat. Nos. 4,852,333 A, 4,555,894 A, 7,392,636 B2, 6,440,256 B1. In other embodiments, some or all of both the housing of cartridge manufacturing equipment 44 and machine housing 12 are transparent, to allow consumers to view the inner workings of vending machine 10, thereby enhancing their experience and/or allowing the consumer to visually verify the cleanliness of the inside of vending machine 10 and/or the inside of equipment 44.

Locking post(s) 46 insert into locking slot(s) 54 when front panel 14 is closed, to allow front panel 14 to be locked by any suitable means in the closed position. It will be appreciated that inserting locking post(s) 46 into locking slot(s) 54 is exemplary, and that any suitable locking mechanism that would prevent the unauthorized access to the inside of vending machine 10 may be utilized. Cash lockbox 48 allows for the removal of bills and coins from vending machine 10 by an authorized serviceman, and it may also allow for the refilling of bill and coin stock used for making change. In other embodiments, an authorized serviceman may be able to access cash lockbox 48 from user interface area 16 on the outside of vending machine 10. In embodiments where there is no monetary input (receipt-based system) or where the only monetary input is card validator 28, cash lockbox 48 is not needed. Bag refilling compartment(s) 50 allow an authorized serviceman to replenish the bag stock used for bag dispenser(s) 38. In other embodiments, an authorized serviceman may be able to access refilling compartment(s) 50 from dispensing area 18 on the outside of vending machine 10. Beverage medium chute 56 allows for a beverage medium to be transferred from beverage medium receptacle 26 to equipment 44.

Operation—FIG. 1 and FIG. 2

As a consumer approaches a vending machine, the consumer observes the display monitor and the user interface. The user interface will make it clear to the consumer that they must have a beverage medium of appropriate fineness in order to proceed, unless the machine is equipped with a grinder. If the consumer has a suitable beverage medium, the consumer places their beverage medium on the scale and selects the type of container in which it is contained (e.g. paper bag, hard plastic container, metal container, etc.). The consumer then enters the appropriate commands at the user interface control system associated with the vending machine to select the quantity of cartridges to be dispensed and/or the type of beverage medium and/or the type of cartridge desired and/or the amount of beverage medium per cartridge.

The user interface control system can employ simple menus and a fixed set of keys for the consumers to make their selections, it can employ break-resistant touch screens, or it can employ a combination of both. Once a selection has been made, the consumer would then merely commit to the purchase (receipt-based system), insert his/her magnetically encoded card into the card validator, or insert cash and/or coins into the bill validator and/or coin insert and, in response, the machine would prompt the consumer to pour the weighed beverage medium into the receptacle. Once the consumer is finished pouring, they will enter the appropriate command and the machine will manufacture and dispense the selected cartridges without the need for any further input by the consumer.

Figure 3A:
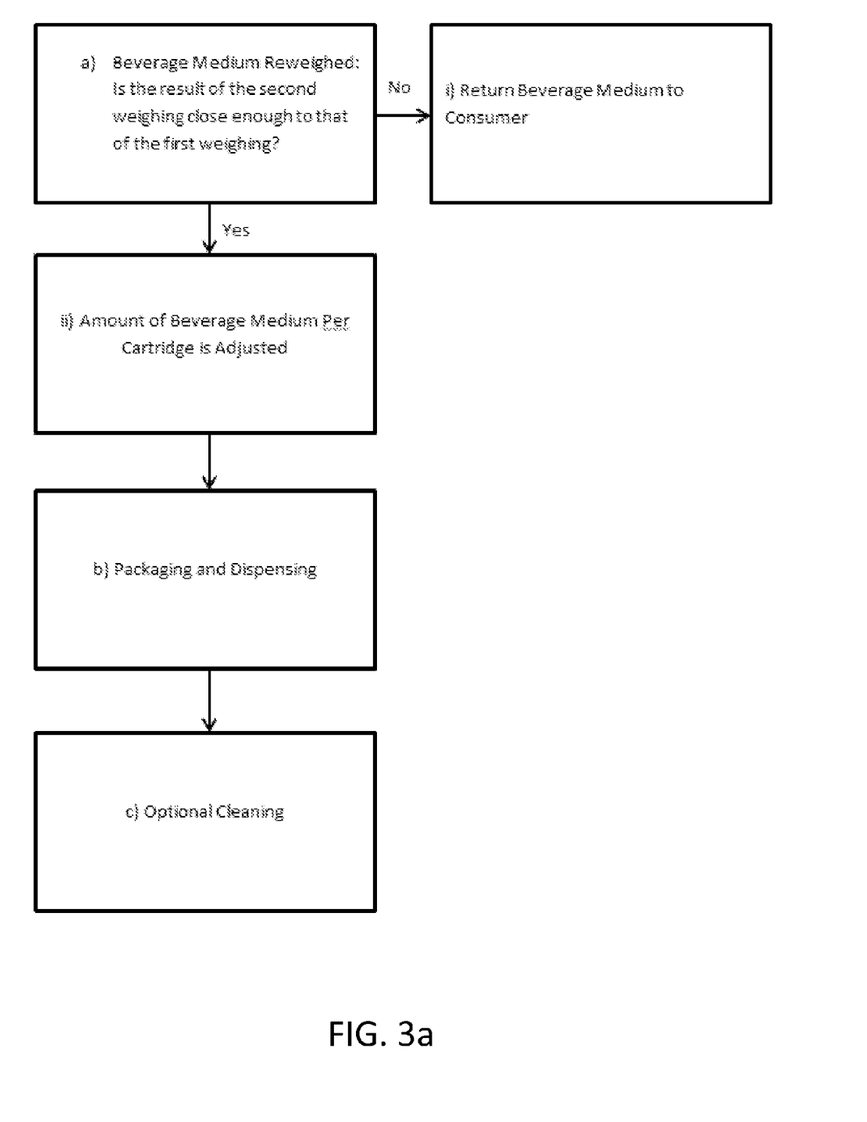
FIG. 3a is a flowchart representing a set of processes that may be executed by a beverage cartridge manufacturing and vending machine.
Figure 3B:
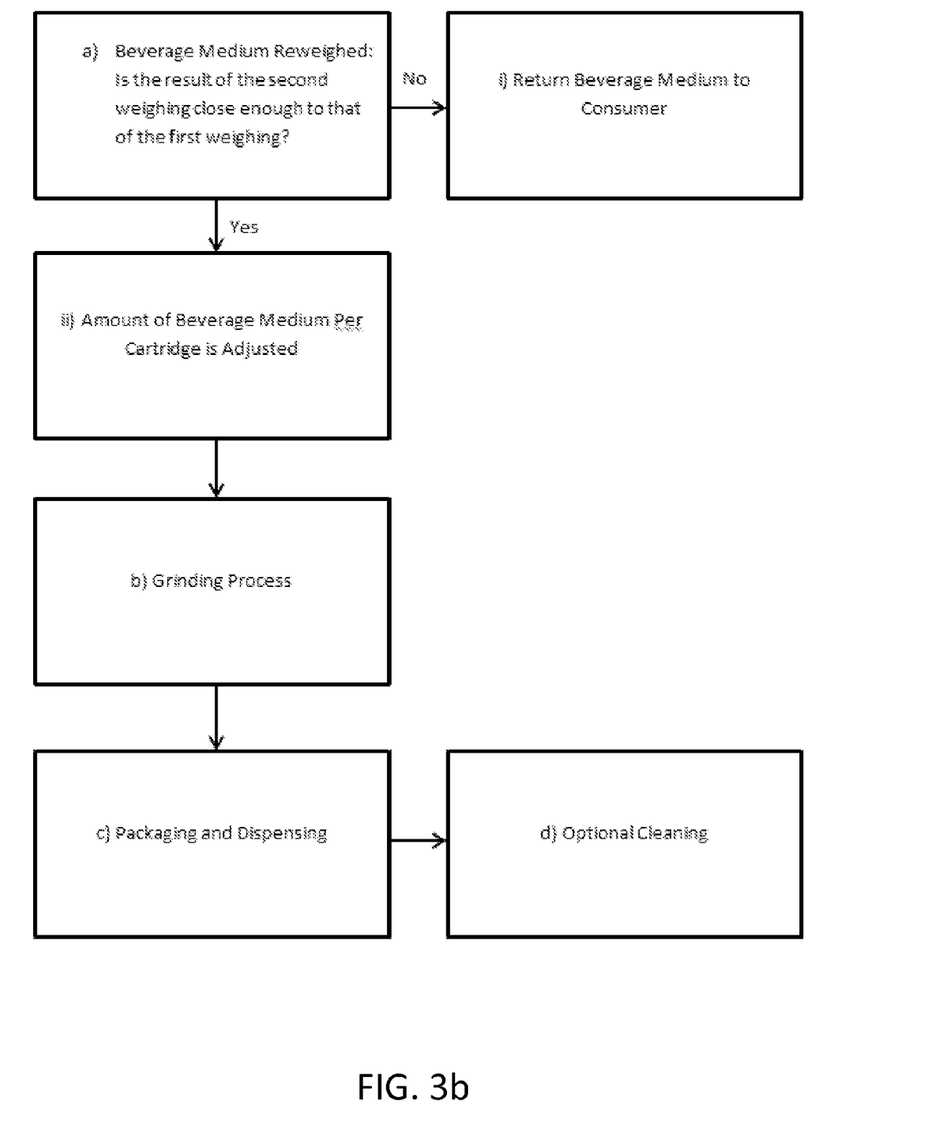
FIG. 3b is a flowchart representing a set of processes that may be executed by a beverage cartridge manufacturing and vending machine.
Figure 3C:
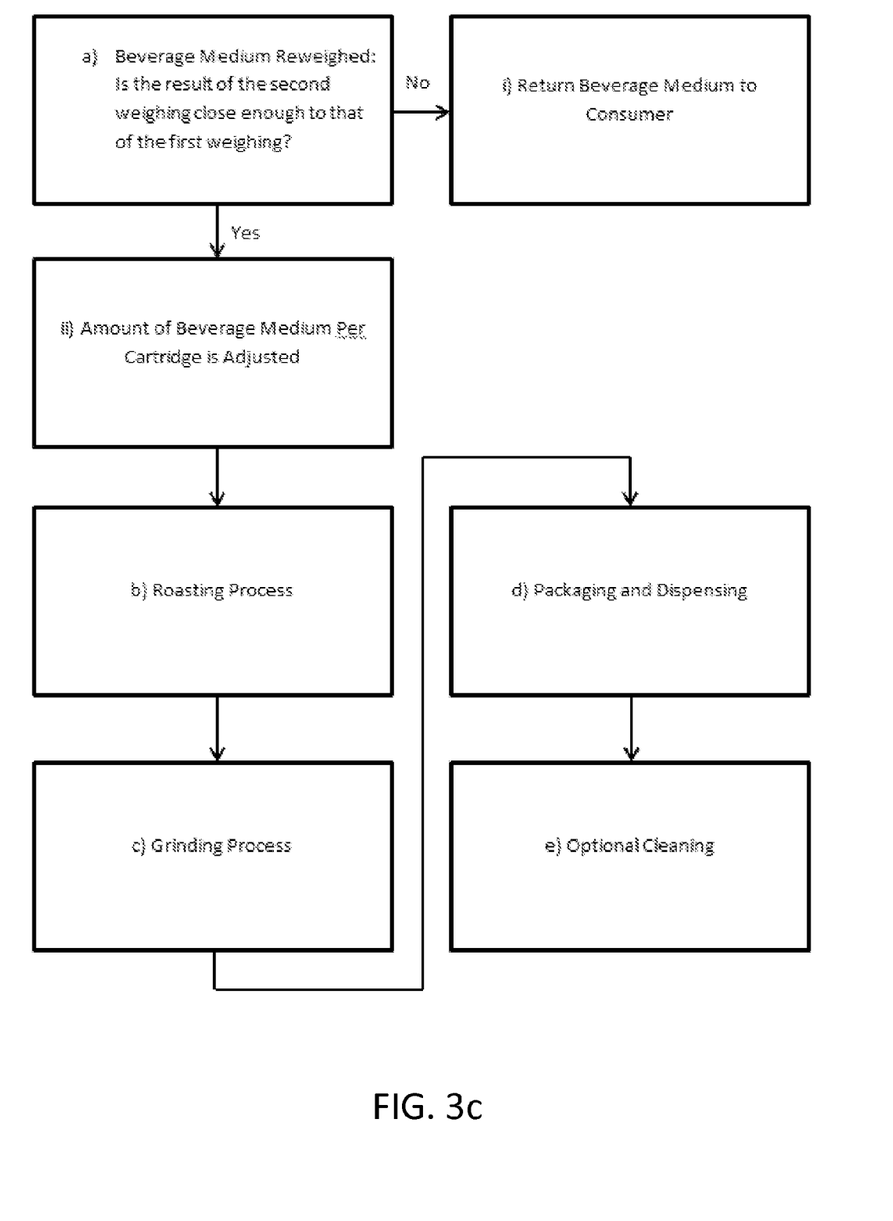
FIG. 3c is a flowchart representing a set of processes that may be executed by a beverage cartridge manufacturing and vending machine.

Processing a Beverage Medium from an External Source—FIG. 3

In the following three figures (FIG. 3a, FIG. 3b, and FIG. 3c), it is assumed that the consumer has obtained their beverage medium from an external source.

In one embodiment, shown as a diagram in FIG. 3a, the processes involved with cartridge manufacturing equipment 44 once the consumer has dumped their beverage medium into beverage medium receptacle 26 are as follows:

a) The beverage medium is reweighed to correct for any consumer error, and either (i) the beverage medium is returned to the consumer through cartridge dispenser 42 (if the result of the second weighing close enough to the result of the first weighing) or (ii) the amount of beverage medium per cartridge is adjusted.
b) If the second weight obtained is within the tolerance, the cartridges are manufactured in a known manner, and are dispensed to the user through cartridge dispenser 42.
c) Equipment 44 may or may not automatically clean itself for a suitably short amount of time. Cleaning may occur after every transaction is completed, after multiple transactions are completed, after a sensor is triggered, at another preset interval, or not at all.

In one embodiment, shown as a diagram in FIG. 3b, the processes involved with cartridge manufacturing equipment 44 once the consumer has dumped their beverage medium into beverage medium receptacle 26 are as follows:

a) The beverage medium is reweighed to correct for any consumer error, and either (i) the beverage medium is returned to the consumer through cartridge dispenser 42 (if the result of the second weighing close enough to the result of the first weighing) or (ii) the amount of beverage medium per cartridge is adjusted.
b) If the second weight obtained is within the tolerance, the beverage medium is sent through a grinding process which grinds the beverage medium to a fineness which is suitable for a particular cartridge-based brewing system. If equipment 44 is able to produce cartridges for more than one type of cartridge-based brewing systems, and those systems require different levels of fineness, the grinding process may adjust automatically to accommodate the required fineness level before grinding.
c) The beverage medium is packaged into cartridges in a suitable manner, and dispensed to the user through cartridge dispenser 42.
d) Equipment 44 may or may not automatically clean itself for a suitably short amount of time. Cleaning may occur after every transaction is completed, after multiple transactions are completed, after a sensor is triggered, at another preset interval, or not at all.

In one embodiment, shown as a diagram in FIG. 3c, the processes involved with cartridge manufacturing equipment 44 once the consumer has dumped their beverage medium into beverage medium receptacle 26 are as follows to make a cartridge.

a) The beverage medium is reweighed to correct for any consumer error, and either (i) the beverage medium is returned to the consumer through cartridge dispenser 42 (if the result of the second weighing close enough to the result of the first weighing) or (ii) the amount of beverage medium per cartridge is adjusted.
b) If the second weight obtained is within the tolerance, the beverage medium is sent through a roasting process (if roasting has been selected by the consumer).
c) The beverage medium is sent through a grinding process which grinds the beverage medium to a fineness which is suitable for a particular cartridge-based brewing system. If equipment 44 is able to produce cartridges for more than one type of cartridge-based brewing systems, and those systems require different levels of fineness, the grinding process may adjust automatically to accommodate the required fineness level before grinding.
d) The beverage medium is packaged into cartridges in a suitable manner, and dispensed to the user through cartridge dispenser 42.
e) Equipment 44 may or may not automatically clean itself for a suitably short amount of time. Cleaning may occur after every transaction is completed, after multiple transactions are completed, after a sensor is triggered, at another preset interval, or not at all.

In other embodiments, equipment 44 may be capable of carrying out the chain of procedures illustrated in (i) FIG. 3a and FIG. 3b, (ii) FIG. 3b and FIG. 3c, (iii) FIG. 3a and FIG. 3c, or (iv) FIG. 3a and FIG. 3b and FIG. 3c.

Processing a Beverage Medium that was Stored Internally

If a vending machine 10 contains one or more stored beverage medium (or media) that is (are) available for purchase, than the beverage medium selected may be dispensed internally into equipment 44, and in that case only one weighing would take place inside vending machine 10.

Therefore, in the case where the beverage medium is dispensed internally, steps a), i) and ii) of FIG. 3a, FIG. 3b, and FIG. 3c may be replaced with a first internal weighing, step a), followed by step b), step c) etc.

Maintenance

Vending machine 10 may require regular maintenance, including restocking, cleaning, and lubricating various components involved with its operation. An authorized serviceman may need to regularly restock one or more consumable components (e.g. empty cup-shaped bases, filters or filter material spools, lids or lid material spools, filtering walls or filtering wall material spools, nitrogen gas, etc.). Vending machine 10 may indicate the need for restocking and/or cleaning and/or lubricating via electrical communication with the central office and/or by a visual and/or audible notification on the machine itself.

Filling and Sealing

The cartridges described in U.S. Ser. No. 00/532,5765A, U.S. Ser. No. 00/584,0189A, and US20120058226A1 are comprised of an impermeable pierceable cup-shaped base, a filter element, a suitable amount of a beverage medium, and a flexible cover. The filter element is sealed into the base at its rim and at the center of its bottom, the beverage medium is dispensed into the filter, nitrogen gas is dispensed into the shell to preserve freshness, and the cover is sealed to the base, thereby enclosing the base.

In some embodiments that fill and seal cartridges like the one described in U.S. Ser. No. 00/532,5765A, U.S. Ser. No. 00/584,0189A, and US20120058226A1, equipment 44 is stocked with pierceable bases, filter elements, and flexible covers, among other things. The filter elements, flexible covers, or both may be a) precut for installation or b) in sheets on spools to be cut as they are installed.

In other embodiments that fill and seal cartridges like the one described in U.S. Ser. No. 00/532,5765A, U.S. Ser. No. 00/584,0189A, and US20120058226A1, equipment 44 is stocked with consumable items, including: flexible covers and pierceable bases which have filters pre-installed.

In still other embodiments that fill and seal cartridges like the one described in U.S. Ser. No. 00/532,5765A, U.S. Ser. No. 00/584,0189A, and US20120058226A1, equipment 44 is stocked with consumable items, including: pierceable bases which have filters and covers pre-installed. In this embodiment, covers contain a small opening which can be used to fill the cartridge with beverage medium and nitrogen before sealing the opening with a smaller flexible or rigid cover. The smaller cover may be made from any suitably strong and water and heat resistant material that is impermeable to air such as food safe heat sealable plastic, food safe metal foil bonded to heat sealable plastic, wax or plastic coated paper, food safe plastic, metal foil, adhesive-backed coated paper etc. Once the beverage medium and nitrogen have been deposited, the smaller cover may be sealed to the larger cover by any suitable method such as heat-sealing, crimping, gluing, UV-curing, applying ultrasonic or microwave energy (e.g., sonic welding), and otherwise.

The cartridge described in US20100239717A1 is comprised of an inverted cup-shaped body, a delivery wall, a suitable amount of a beverage medium, and filtering wall. The beverage medium is dispensed into the body, nitrogen gas is dispensed into the shell to preserve freshness, and the delivery wall and the filtering wall are sealed to the body, thereby enclosing the body.

In some embodiments that fill and seal cartridges like the one described in US20100239717A1, equipment 44 is stocked with consumable items, including: cup-shaped bodies, delivery walls, and filtering walls. The delivery walls, the filtering walls, or both may be a) precut for installation or b) in sheets on spools to be cut as they are installed.

The cartridge described in US20120070542A1 is comprised of a cup-shaped body, a lid, and a suitable amount of an instant beverage medium. Typically, the beverage medium is dispensed into the body, nitrogen gas is dispensed into the shell to preserve freshness, and the lid is sealed to the body, thereby enclosing the body.

In some embodiments that fill and seal cartridges like the one described in US20120070542 A1, equipment 44 is stocked with consumable items, including: cup-shaped bodies and lids. The lids may be a) precut for installation or b) in sheets on spools to be cut as they are installed.

While certain embodiments of the present invention have been described, it will be appreciated that changes and modifications can be made and that other embodiments may be devised without departing from the true spirit and scope of the invention.

I claim:

1. A method for the decentralized manufacturing and customization of beverage cartridges, comprising:
  (a) Installing a plurality of geographically distributed beverage cartridge manufacturing and vending machines which use known means to be in electrical communication with each other and with a suitably centralized location such that the machines and the centralized location form a distribution network;
  (b) Weighing a quantity of beverage medium provided by a consumer using a scale which is incorporated into a particular one of the machines to obtain a first weight;
  (c) Obtaining instructions from the consumer through the use of a user interface area of the particular machine for the purpose of manufacturing and dispensing beverage cartridges;
  (d) Accepting and confirming user payment within the particular machine;
  (e) Receiving the beverage medium into a receptacle of the particular machine;
  (f) Reweighing the beverage medium which has been received into the receptacle to obtain a second weight;
  (g) Determining if the second weight is within a tolerance from the first weight;
  (h) Returning the beverage medium to the consumer if the second weight is not within the tolerance;
  (i) Using a known means to manufacture beverage cartridges inside of a cabinet housing of the particular machine if the second weight is within the tolerance;
  (j) Dispensing the beverage cartridges to the user in a dispensing area of the particular machine if the second weight is within the tolerance;
  (k) Communicating information which is pertinent to the operation and maintenance of the network between the machines and between the machines and the centralized location;
  (l) Using the communicated information to coordinate the restocking of materials used to manufacture beverage cartridges.

* * * * *